(12) United States Patent
Holm

(10) Patent No.: US 10,058,071 B2
(45) Date of Patent: Aug. 28, 2018

(54) SUCTION TEAT ARRANGEMENT FOR AN AUTOMATIC FEEDER

(71) Applicants: Hans Joachim Holm, Westerronfeld (DE); Hans Joachim Laue, Osterroenfeld (DE)

(72) Inventor: Hans Joachim Holm, Westerronfeld (DE)

( * ) Notice: Subject to any disclaimer, the term of this patent is extended or adjusted under 35 U.S.C. 154(b) by 211 days.

(21) Appl. No.: 14/930,964

(22) Filed: Nov. 3, 2015

(65) Prior Publication Data

US 2016/0135425 A1 May 19, 2016

(30) Foreign Application Priority Data

Nov. 3, 2014 (EP) .................................. 14191484

(51) Int. Cl.
*A01K 9/00* (2006.01)
*A01K 5/02* (2006.01)

(52) U.S. Cl.
CPC .............. *A01K 5/0216* (2013.01); *A01K 9/00* (2013.01); *A01K 9/005* (2013.01)

(58) Field of Classification Search
CPC .......... A01K 9/00; A01K 9/005; A01K 29/00; A01K 5/02; A01K 5/0275; A01K 7/02; A01K 5/0216; A01K 5/0233
See application file for complete search history.

(56) References Cited

U.S. PATENT DOCUMENTS

| | | | | |
|---|---|---|---|---|
| 3,192,902 | A * | 7/1965 | Gammill | A01K 5/0216 119/51.11 |
| 3,874,342 | A * | 4/1975 | Kloss | A01K 9/00 119/71 |
| 5,551,371 | A * | 9/1996 | Markey | A01K 1/033 119/165 |
| 6,016,769 | A * | 1/2000 | Forster | A01K 5/0216 119/71 |
| 6,360,691 | B1 * | 3/2002 | Laue | A01K 5/0216 119/57.92 |
| 2003/0150392 | A1 * | 8/2003 | Sundborger | A01K 1/12 119/71 |
| 2006/0201435 | A1 * | 9/2006 | Arnerup | A01K 7/022 119/71 |
| 2010/0224131 | A1 * | 9/2010 | Lee | A01K 9/00 119/71 |
| 2011/0126772 | A1 * | 6/2011 | Arnerup | A01K 9/00 119/72 |
| 2013/0327275 | A1 * | 12/2013 | Foerster | A01K 5/02 119/51.02 |

FOREIGN PATENT DOCUMENTS

| | | |
|---|---|---|
| DE | 2010845 | 9/1971 |
| DE | 19957969 | 5/2001 |

* cited by examiner

*Primary Examiner* — Trinh T Nguyen

(74) *Attorney, Agent, or Firm* — Stuart H. Mayer; Mayer & Williams PC

(57) ABSTRACT

Suction teat arrangement for an automatic feeder for feeding livestock, in particular calves, with a suction teat holder, which has a suction teat receiver for receiving a suction teat, a fastening device for fastening the suction teat holder on a feed stand and a supply connection for connection with a supply line, a valve, with which a liquid supply from the supply line to the suction teat can be released and blocked, and a branch connection for connection with a branch line, characterized in that the valve and the branch connection are integrated into the suction teat holder.

13 Claims, 5 Drawing Sheets

SUCTION TEAT ARRANGEMENT FOR AN AUTOMATIC FEEDER

BACKGROUND OF THE INVENTION

The invention relates to a suction teat arrangement for an automatic feeder for feeding livestock, in particular calves. There are high sanitary requirements for feeding calves with automatic feeders. The feed product is generally freshly mixed for each individual feeding procedure based on powdered milk. By sucking on a suction teat, a calf can suck its feed product ration out of a mixing container via a supply line. The flow of such a feeding procedure mainly corresponds with the natural drinking behavior of a calf. The mixing container, suction teat and supply line are regularly cleaned, in particular by rinsing with water and/or cleaning fluid. In the process, it should be prevented that a calf comes in contact with the cleaning fluid or respectively consumes cleaning agent during a subsequent feeding procedure.

A suction teat arrangement with an automatic feeder became known from the document DE 199 57 969 C1. A shutoff valve is arranged in a supply line, which connects a mixing container with the suction teat fastened on a feed stand. Between the mixing container and the shutoff valve, the supply line has a branch connection, to which a branch line, in which a pump is located, is connected. In order to clean the known device, a cleaning fluid is added to the mixing container and is first fed via the supply line into the branch line by means of the pump. The conveying direction of the pump is then reversed. A return flow of the cleaning agent out of the branch line to the mixing container is prevented by a check valve. When the shutoff valve is open, the cleaning agent then moves out of the branch line from the branch connection via the downstream part of the supply line to the suction teat. In order to prevent an animal from coming in contact with the cleaning agent, the suction teat is pivoted upwards during the cleaning procedure and covered by a cover plate.

Based on this background, the object of the invention is to provide a suction teat arrangement, which can be more easily produced, installed and cleaned.

SUMMARY OF THE INVENTION

This object is solved by the suction teat arrangement with the characteristics of claim 1. Advantageous embodiments are specified in the subsequent dependent claims.

The suction teat arrangement is provided for an automatic feeder for feeding livestock, in particular calves, and has a suction teat holder, which has a suction teat receiver for receiving a suction teat, a fastening device for fastening the suction teat holder on a feed stand and a supply connection for connection with a supply line, a valve, with which a liquid supply from the supply line to the suction teat can be released and blocked, and a branch connection for connection with a branch line, wherein the valve and the branch connection are integrated into the suction teat holder.

The feed stand can be a part of an automatic feeder or a wall or another carrier at a feeding station, for example a wall of a calf crate in a stall. The suction teat holder is fastened to it with a fastening device. The fastening device can be for example a fastening flange, a bore hole, a clamp fastening, a thread or another screw connection.

The supply connection serves for connection with a supply line, which is connected in particular with a mixing container. The supply connection can be for example an adapter for a hose or a pipeline connection. The branch connection serves for connection with a branch line, which can lead in particular to a drain or back to the mixing container. The branch connection can also be for example an adapter for a hose or a pipeline connection.

With the valve, the liquid supply from the supply line to the suction teat can be released and blocked. The supply of feed product can thereby be controlled on one hand. On the other hand, the blocking of the valve prevents cleaning fluid from getting to the suction teat.

In the invention, not just the supply connection but also the valve and the branch connection are integrated into the suction teat holder. These three elements, through which the feed product as well as a cleaning fluid are to be fed, are thus arranged in an extremely compact manner. In particular, a cleaning fluid supplied via the supply connection and discharged via the branch connection can flow through the suction teat holder almost directly or directly up to the suction teat.

Differently than the initially described arrangement known from the state of the art, the valve and the branch connection are arranged in the tightest space and simultaneously very close to the suction teat. In particular, there is no supply line section between the suction teat and the valve with the exception of any line sections integrated into the suction teat holder. It is thus possible to clean completely the entire arrangement, except for the suction teat itself and if applicable parts of a suction teat holder, when the valve is closed without cleaning agent getting into the suction teat.

If the suction teat itself needs to be included in the cleaning, this is possible when the valve is open. No animals should have access to the suction teat during such a cleaning procedure. In order to guarantee this, the suction teat arrangement can be provided with an access block. Due to the directly adjacent arrangement of suction teat and valve, only little cleaning fluid and little rinsing liquid are needed. The cleaning procedure of the suction teat arrangement can thus be performed particularly fast and cost-effectively.

A further advantage is that, through the integration of branch connection and valve into the suction teat holder, the entire suction teat arrangement forms a compact, pre-installable unit, which is particularly easy to install on an automatic feeder. In particular, no separate fastening of the valve on the feed stand is required; neither is a separate connection line between valve and suction teat needed.

In one embodiment, the suction teat receiver has a shaft section provided with a through hole, on which a rear opening of a suction teat can be mounted. Conventional suction teats often have a fastening flange, which is fastened in a sealing manner with a coupling nut. The mounting of the suction teat on a shaft section of the suction teat receiver, which engages in the rear opening of the suction teat, wherein a seal is created between the shaft section and the inside of the suction teat, is a particularly simple alternative. Additionally, the suction teat can have a flange.

In one embodiment, the valve has an adjustable valve member and a valve seat which is formed by the suction teat receiver. The suction teat receiver designed as one or multiple pieces thus acts a valve seat itself and the suction teat receiver and valve member are combined into a particularly compact unit.

In one embodiment, the valve seat is designed on an edge of the through hole. In this case, the suction teat receiver can preferably be designed as one piece. The valve then seals very closely to the suction teat so that, even when the valve is closed, the entire suction teat arrangement with the exception of the inside of the suction teat can be cleaned.

In one embodiment, the valve is arranged between the branch connection and the supply connection. In the process of a cleaning procedure, in which the cleaning fluid flows from the branch connection to the supply connection or vice versa when the valve is closed, parts of the valve are thus rinsed by the cleaning fluid, which effectuates a particularly thorough cleaning. That the valve is arranged between the two connections does not mean that its blocking effect separates the two connections from each other. However, parts of the valve are located between the two connections so that they are flushed in the case of a flow between the two connections.

In one embodiment, the suction teat arrangement has a hollow space, in which the supply connection, the branch connection and the through hole of the shaft section merge. The supply connection and the branch connection are interconnected regardless of the valve position via the hollow space. The connection to the through hole of the shaft section can be blocked by the valve. The design of a hollow space, at which all three named elements meet, enables a complete cleaning of the suction teat arrangement when the valve is closed with the exception of the elements arranged on the other side of the through hole, in particular the suction teat itself.

In one embodiment, the adjustable valve member is arranged in the hollow space. The valve member is thereby also captured by the cleaning when cleaning fluid is fed through the hollow space. In particular, the branch connection and the supply connection can lead into the hollow space on opposite-lying sides. For example, the hollow space can be designed in an annular or discoidal manner, wherein the adjustable valve member is arranged in the middle of the ring or respectively the disk. The through hole can extend in the axial direction with respect to the annular or discoidal hollow space. The branch connection and the supply connection can be arranged radially with respect to the annular or discoidal hollow space.

In one embodiment, the valve has a variable opening cross-section, which can be adjusted continuously or in at least three stages. The suction teat arrangement can have a controller, which sets a desired valve position for a feeding procedure, for example with a step motor. This can occur in particular for each animal individually, for example after detecting an animal by means of a transponder and/or depending on the age or a known sucking behavior of the animal. In general, a valve can also be used which can be adjusted only between a completely open position and a completely closed position. A differentiated adjustment into at least three or more stages or continuously, however, variably enables the adjustment of the flow resistance for the different suction rates of the animals. The flow resistance can be selected such that each animal has satisfied its inherent need to suck after having received its feed ration.

In one embodiment, the suction teat receiver and the valve are held on the fastening device with a holding device so that they can be separated from the fastening device without tools, wherein the supply connection and the branch connection remain on the fastening device. The suction teat receiver and valve can form in particular a compact, jointly removable unit. This enables a particularly simple removal of the suction teat and valve for maintenance and cleaning purposes. Supply connection and branch connection as well as lines connected to them remain on the suction teat holder fastened on the feed stand and must thus not be touched.

In one embodiment, the holding device has a clamp fastening. The clamp fastening can have for example a lock or snap closure or one or more clamping levers. This enables a simple inserting and release of suction teat receiver and valve.

In one embodiment, the suction teat holder has a joint so that the suction teat receiver is pivotably mounted on the feed stand. The suction teat can thereby also be pivoted into an anatomically beneficial position for calves of different sizes. The joint can be arranged at a distance from a swivel axis, around which the suction teat receiver is pivotable. For example, it can have cylinder-sleeve-shaped or spherical-shell-shaped joint surfaces.

The object specified above is also solved by the automatic feeder according to claim 12, which has a suction teat arrangement according to one of claims 1 to 11, a supply line and a mixing container for mixing a liquid feed product which is connected with the supply connection via the supply line. For the characteristics and advantages of the automatic feeder, reference is made to the explanations above, which are applicable correspondingly.

In one embodiment, the automatic feeder has a pump, which is connected with the branch connection or with the supply connection. With the pump, liquid feed product and/or cleaning fluid can be fed to the suction teat or respectively through the suction teat arrangement.

In one embodiment, the branch connection is connected to a branch line and the pump is a hose pump, which is arranged in the branch line. With the hose pump, a liquid located in the mixing container (liquid feed product or cleaning fluid) can be conveyed to the branch connection via the supply connection. Since, in the case of a hose pump, the branch line is automatically closed when the pump is not running, liquid can be sucked out of the supply line whenever the valve is open. A separate shutoff valve is not needed for the branch line.

In one embodiment, the pump is a centrifugal pump, which is arranged in the supply line. When the centrifugal pump is not running, a calf can also suck liquid via the supply line with this arrangement. The branch line can then either be closed with a separate valve or it can be fed back to the mixing container so that supply line and branch line together form a closed ring line.

BRIEF DESCRIPTION OF THE DRAWINGS

The invention is explained in greater detail below based on exemplary embodiments shown in figures. They show in.

DETAILED DESCRIPTION OF THE INVENTION

Figure 1:
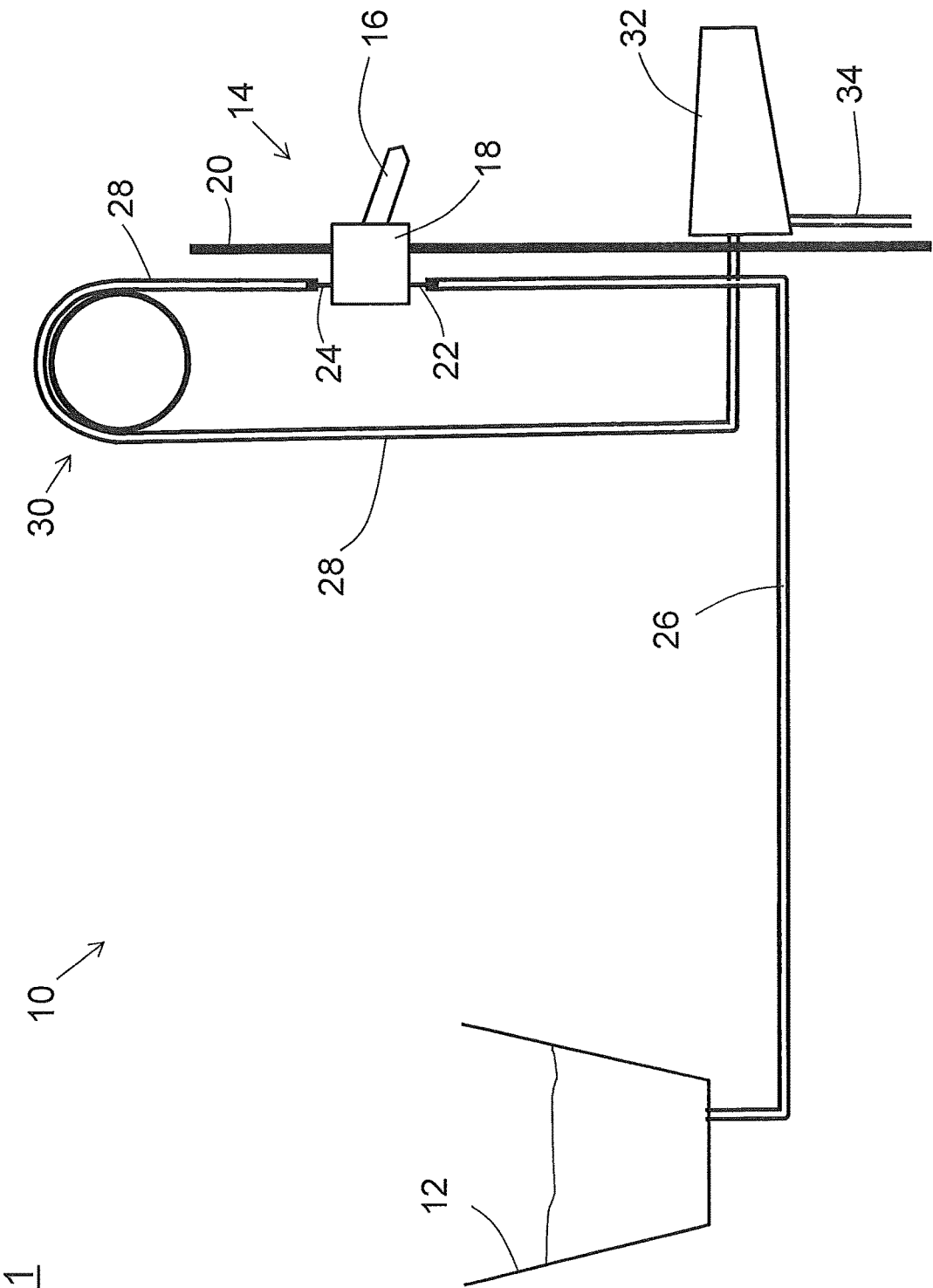
FIG. 1 is an automatic feeder according to the invention with a suction teat arrangement in a schematic representation.

FIG. 1 shows schematically an automatic feeder 10 with a mixing container 12 and a suction teat arrangement 14. The suction teat arrangement 14 has a suction teat 16, a suction teat holder 18, which is fastened on a wall 20 of the automatic feeder 10 or a feed stand. The suction teat holder 18 has a supply connection 22 and a branch connection 24.

The supply connection 22 is connected with the mixing container 12 via a supply line 26. The branch connection 24 is connected with a branch line 28, in which a hose pump 30 is arranged. The branch line 28 leads to a drain 34 via a collecting tank 32. The collecting tank 32 is arranged below the suction teat 16 and fastened to the wall 20. In the process of a cleaning procedure, dripping cleaning fluid in the area of the suction teat 16 is collected in the collecting tank 32 just like dripping mucous or feed product residue during drinking in the area of the suction teat 16.

Within the suction teat holder 18, the supply connection 22 and the branch connection 24 are interconnected. Moreover, a valve 42 (not shown, see FIGS. 3 to 5), which can release and block a connection between the supply connection 22 and the suction teat 16, is located between the two connections.

Figure 2:
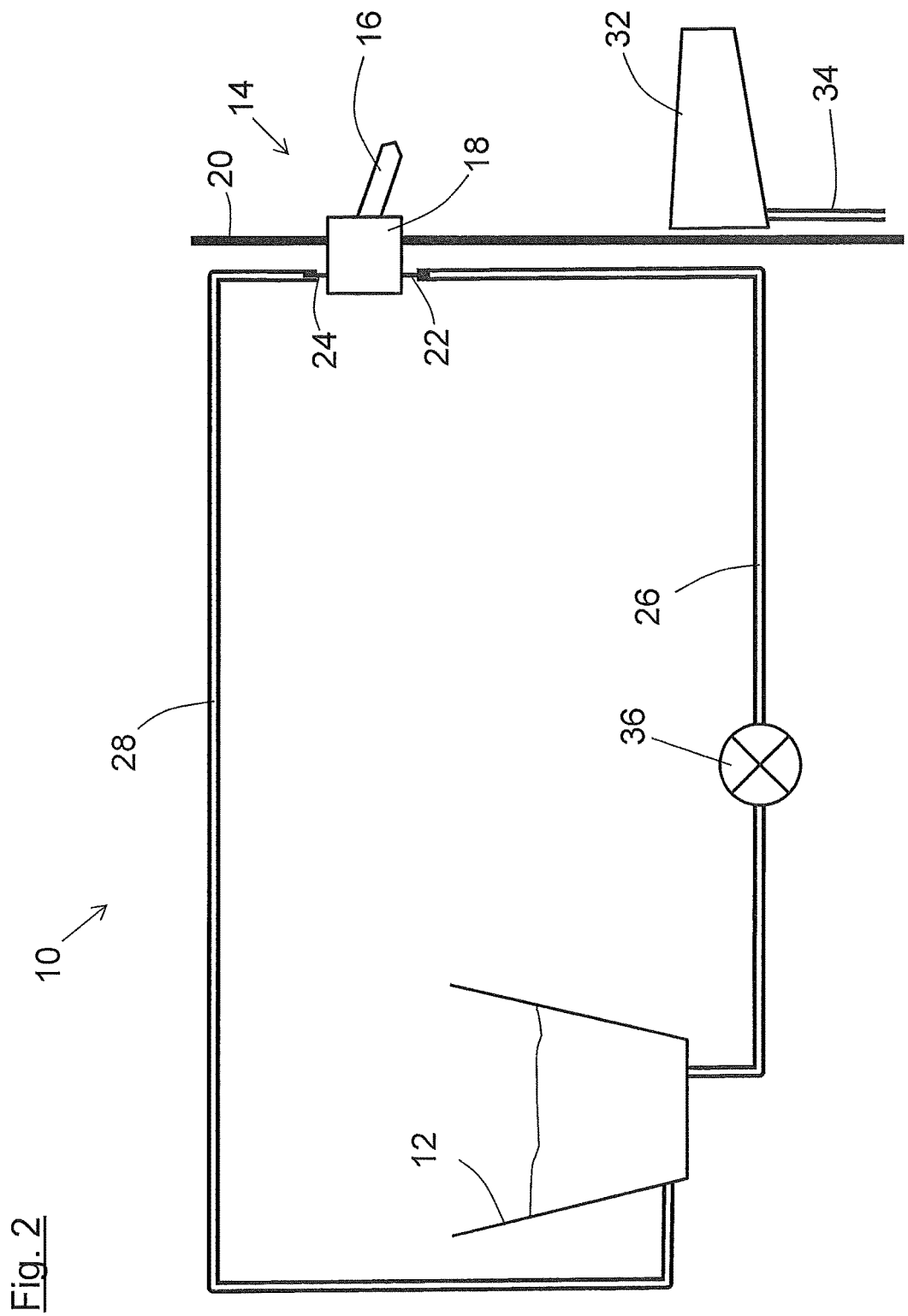
FIG. 2 is a second exemplary embodiment of an automatic feeder according to the invention with a suction teat arrangement, also schematically.

In the exemplary embodiment of FIG. 2, which is also only schematically represented, the branch line 28 does not lead via the collecting tank 32 to the drain 34, but rather back to the mixing container 12. A closed ring line is created in this manner. A further difference from the exemplary embodiment of FIG. 1 is that no pump is arranged in the branch line 28. Instead, a centrifugal pump 36 is located in the supply line 26, with which liquid can be fed out of the mixing container 12 to the supply connection 22.

Figure 3:
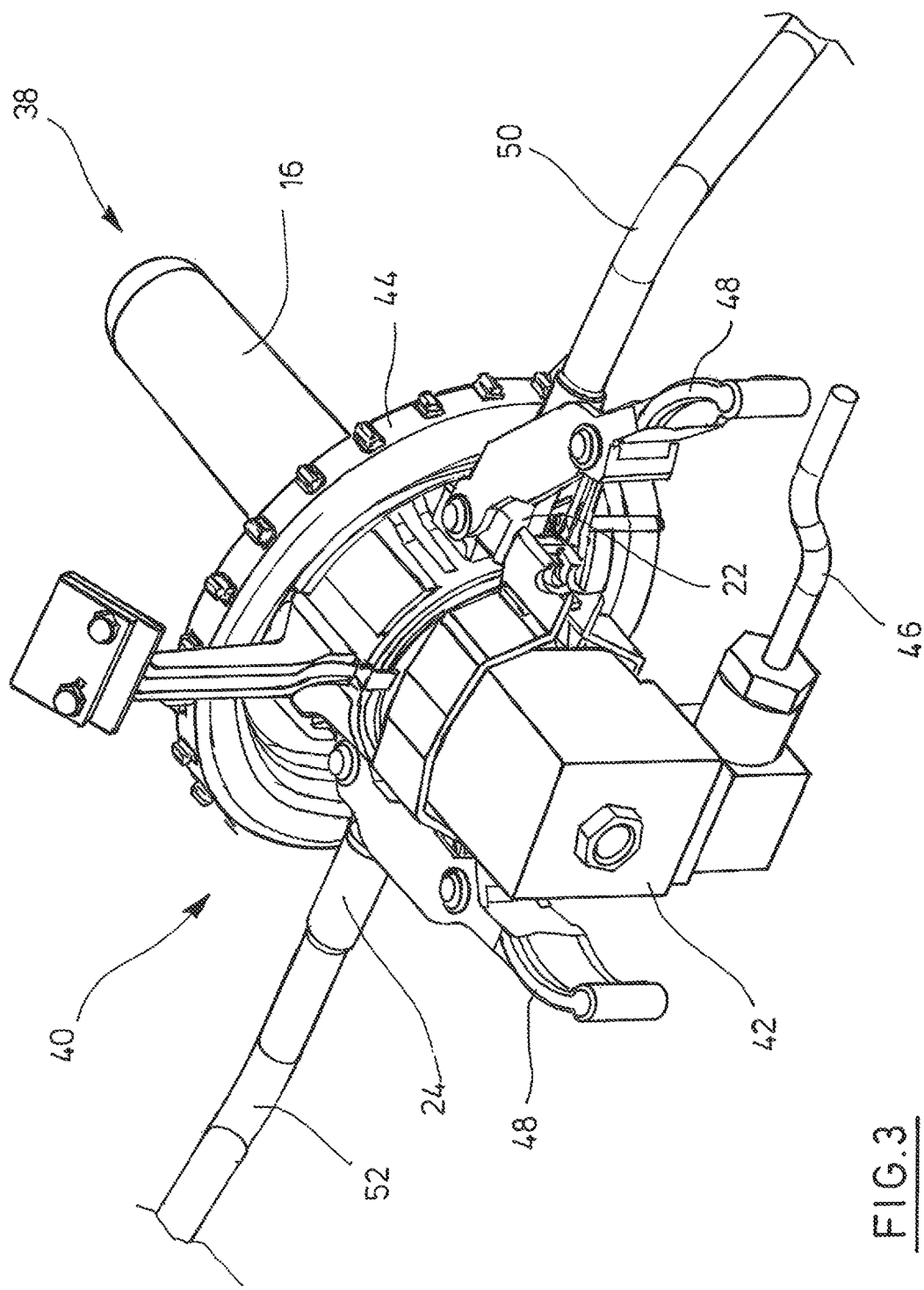
FIG. 3 is a suction teat arrangement according to the invention in a perspective view.

FIG. 3 shows a suction teat arrangement 38 with a suction teat holder 40, a valve 42, a fastening device 44 for fastening the suction teat holder 40 on a feed stand, a supply connection 22 and a branch connection 24.

The valve 42 is a magnetic valve, which has an electric control line 46. A holding device of the suction teat holder 40 has two clamping levers 48, with which the valve 42, a suction teat receiver 54 (see FIGS. 4 and 5) and the suction teat 16 are held on the fastening device 44.

The supply connection 22 has a connecting piece, onto which a supply line 50 is mounted. Accordingly, the branch connection 24 has a connecting piece, onto which a branch line 52 is mounted.

Figure 4:
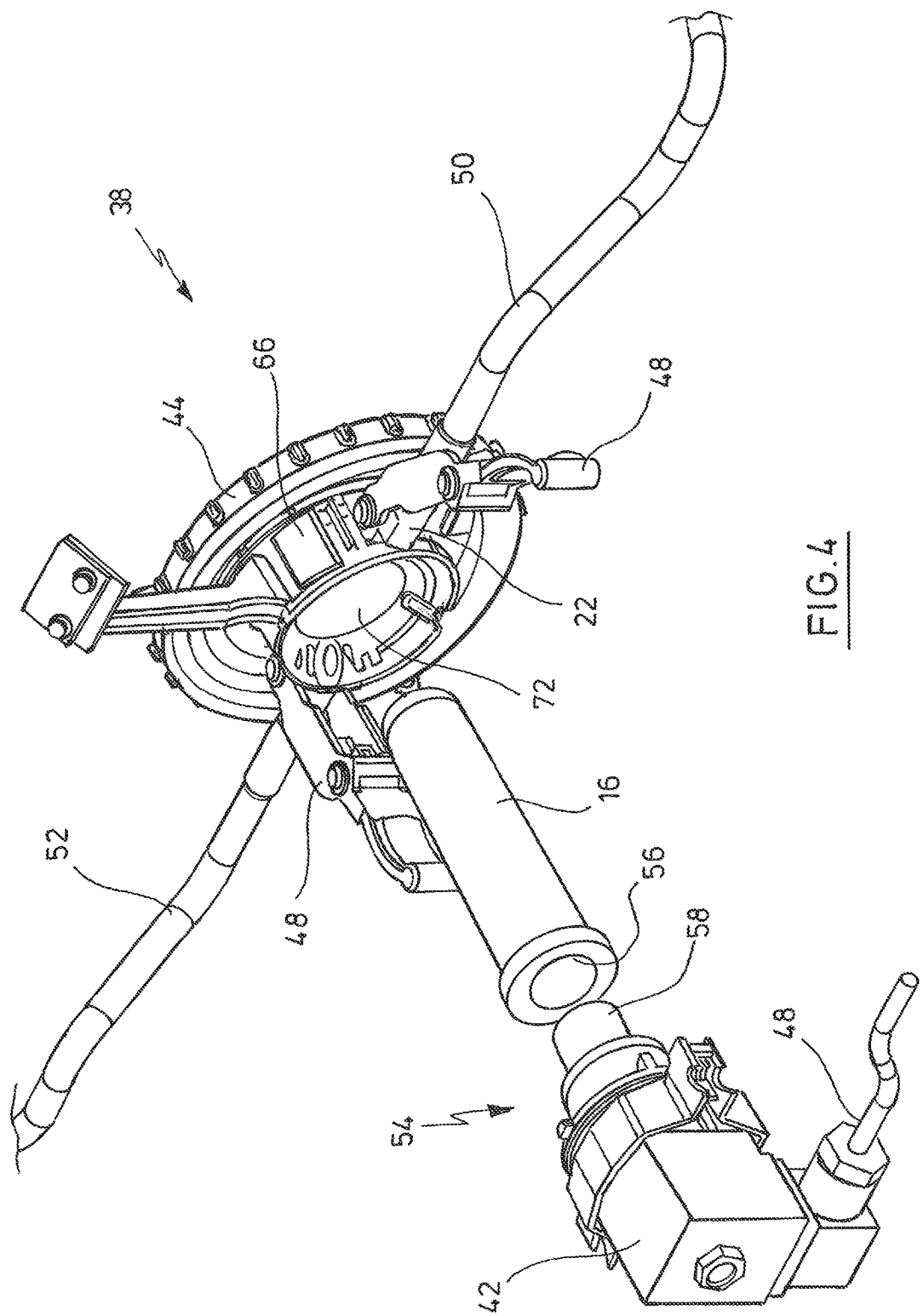
FIG. 4 is the suction teat arrangement from FIG. 3 in an open arrangement, also in a perspective representation.

FIG. 4 shows the suction teat arrangement 38 from FIG. 3 after the opening of the holding device and the removal of the valve 42 with suction teat receiver 54 and suction teat 16 from the fastening device 44. In order to rejoin the named elements, the suction teat 16 with its rear opening 56 is pushed onto a shaft section 58 of the suction teat receiver 54, which has a through hole 76 (see FIG. 5). The suction teat 16, the suction teat receiver 54 and the valve 42 are then inserted together from behind into the suction teat holder 40 and secured with the two clamping levers 48.

Figure 5:
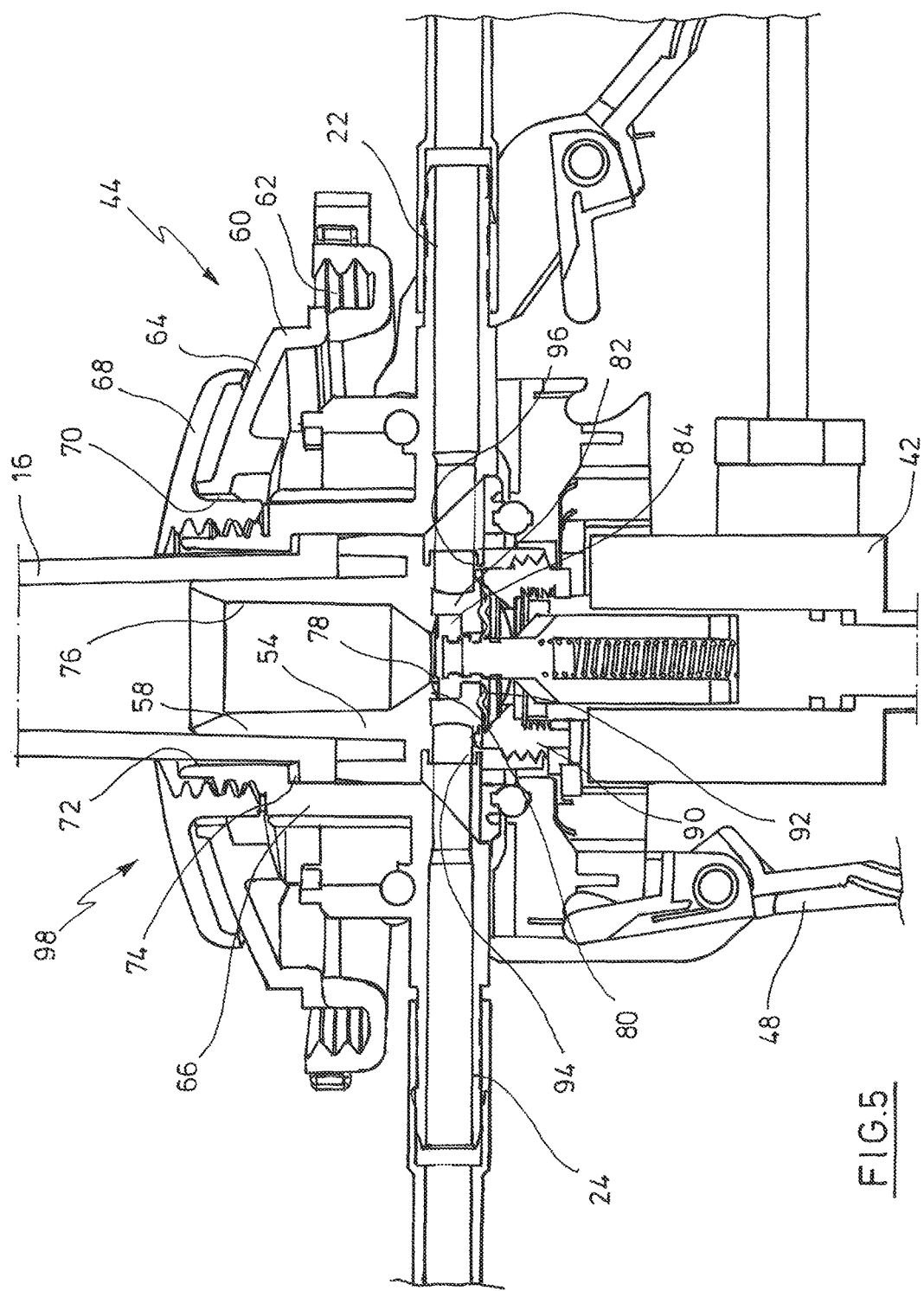
FIG. 5 is a section of the suction teat arrangement from FIG. 3 in cross-section.

Additional details are best seen in the sectional representation in FIG. 5. It can be seen there that the fastening device 44 is comprised of several elements: An outer fastening ring 60 has a thread 62, which is screwed with a complementarily designed thread on a feed stand. For this, the feed stand has a circular opening, into which the outer fastening ring 60 with a spherical shell-shaped, inner ring section 64 is inserted. A rear part 66 of the fastening device 44 is screwed with a coupling ring 68 within an inner opening 70 of the outer fastening ring 60. The rear part 66 with the coupling ring 68 is then pivotably arranged in the inner opening 70, wherein the spherical-shell-shaped, inner ring section 64 and the elements interacting with it form a joint 98.

The rear part 66 of the fastening device 44 has a through hole 72, in which a step 74 is formed. The suction teat receiver 54 has a mainly circular cylindrical shaft section 58 with a through hole 76. The rear opening 56 of the suction teat 16 is mounted on the shaft section 58.

The through hole 76 in the shaft section 58 tapers on its rear end conically up to an opening edge 78, on which a valve seat 80 is formed.

The supply connection 22 and the branch connection 24 are formed on the rear part 66 of the fastening device 44. The supply connection 22, the branch connection 24 and the through hole 76 end in an approximately discoidal hollow space 82, in which an adjustable valve member 84 of the valve 42 is arranged. In the shown, closed position of the valve 42, the adjustable valve member 84 is sealed from valve seat 80. The supply connection 22 and the branch connection 24 are simultaneously interconnected via the hollow space 82 so that a cleaning fluid fed through the suction teat arrangement 40 for cleaning purposes covers the entire arrangement including the adjustable valve member 84 up to right against the valve seat 80. Only the suction teat 16 and the suction teat receiver 54 arranged partially within the suction teat 16 are not flowed through by the cleaning fluid when the valve 42 is closed.

The suction teat receiver 54, within which the hollow space 82 is formed, is screwed with a fastening section 90 of the valve 42, wherein a membrane 92 of the valve 42 is clamped in a sealing manner between the fastening section 90 and the suction teat receiver 54. Valve 42 and suction teat receiver 54 can be removed from the suction teat holder 40 as a compact unit, as described after the release of the clamp fastening with the two clamping levers 48.

Two elastic sealing elements 86, 88 that are approximately triangular in the shown sectional plane—i.e. in its axial direction—provide a seal between the supply connection 22 or respectively the branch connection 24 and therewith connected, corresponding openings 94, 96 in the suction teat receiver 54.

The invention claimed is:

1. A suction teat arrangement for an automatic feeder for feeding livestock, in particular calves, with
    a suction teat holder, which has a suction teat receiver for receiving a suction teat, a fastening device for fastening the suction teat holder on a feed stand and a supply connection for connection with a supply line, wherein the suction teat receiver has a shaft section provided with a through hole, on which a rear opening of a suction teat can be mounted,
    a valve, with which a liquid supply from the supply line to the suction teat can be released and blocked,
    a branch connection for connection with a branch line, wherein
    the valve and the branch connection are integrated into the suction teat holder, and wherein the suction teat arrangement has a hollow space, in which the supply connection; the branch connection and the through hole of the shaft section end.

2. The suction teat arrangement according to claim 1 the valve has an adjustable valve member and a valve seat, which is formed by the suction teat receiver.

3. The suction teat arrangement according to claim 1, wherein the valve seat is designed on an edge of the through hole.

4. The suction teat arrangement according to claim 1, wherein the valve is arranged between the branch connection and the supply connection.

5. The suction teat arrangement according to claim 1, wherein the adjustable valve member is arranged in the hollow space.

6. The suction teat arrangement according to claim 1, wherein the valve has a variable opening cross-section, which can be adjusted continuously or in at least three stages.

7. The suction teat arrangement according to claim 1, wherein the suction teat holder has a joint so that the suction teat receiver is pivotably mounted on the feed stand.

8. An automatic feeder with a suction teat arrangement according to claim 1, wherein a supply line and a mixing container for mixing a liquid feed product, which is connected with the supply connection via the supply line.

9. The automatic feeder according to claim 8, further comprising a pump, which is connected with the branch connection.

10. The automatic feeder according to claim 9, wherein a branch line is connected to the branch connection and the pump is a hose pump, which is arranged in the branch line.

11. The automatic feeder according to claim 9, wherein the pump is a centrifugal pump, which is arranged in the supply line.

12. A suction teat arrangement for an automatic feeder for feeding livestock, in particular calves, with a suction teat holder, which has a suction teat receiver for receiving a suction teat, a fastening device for fastening the suction teat holder on a feet stand and a supply connection for connection with a supply line, wherein the suction teat receiver and a valve are held on the fastening device with a holding device so that they can be separated from the fastening device without tools, wherein the supply connection and the branch connection (24) remain on the fastening device.

the valve, with which a liquid supply from the supply line to the suction teat can be released and blocked, and branch connection for connection with a branch line, wherein the valve and the branch connection are integrated into the suction teat holder.

13. The suction teat arrangement according to claim 12, wherein the holding device has a clamp fastening.

* * * * *